United States Patent
Epps, III et al.

(10) Patent No.: US 9,935,332 B2
(45) Date of Patent: Apr. 3, 2018

(54) TAPERED BLOCK COPOLYMER ELECTROLYTES

(71) Applicants: Thomas H. Epps, III, Bear, DE (US); Wei-Fan Kuan, Newark, DE (US)

(72) Inventors: Thomas H. Epps, III, Bear, DE (US); Wei-Fan Kuan, Newark, DE (US)

(73) Assignee: UNIVERSITY OF DELAWARE, Newark, DE (US)

( * ) Notice: Subject to any disclaimer, the term of this patent is extended or adjusted under 35 U.S.C. 154(b) by 584 days.

(21) Appl. No.: 14/592,441

(22) Filed: Jan. 8, 2015

(65) Prior Publication Data

US 2015/0197585 A1 Jul. 16, 2015

Related U.S. Application Data

(60) Provisional application No. 61/924,922, filed on Jan. 8, 2014.

(51) Int. Cl.
| | |
|---|---|
| C08F 22/10 | (2006.01) |
| C08F 293/00 | (2006.01) |
| H01M 10/0565 | (2010.01) |
| H01M 10/0525 | (2010.01) |
| C08L 53/00 | (2006.01) |

(52) U.S. Cl.
CPC ..... *H01M 10/0565* (2013.01); *C08F 293/005* (2013.01); *C08L 53/00* (2013.01); *H01M 10/0525* (2013.01); *C08F 2438/01* (2013.01); *H01M 2300/0082* (2013.01)

(58) Field of Classification Search
CPC .............. C08F 293/00; C08F 293/005; H01M 2300/0082
See application file for complete search history.

(56) References Cited

U.S. PATENT DOCUMENTS

| | | |
|---|---|---|
| 6,361,901 B1 | 3/2002 | Mayes |
| 2005/0256256 A1 | 11/2005 | Muramoto |
| 2008/0166636 A1* | 7/2008 | Niitani .................. C08F 290/06 429/317 |

OTHER PUBLICATIONS

Hallinan, D., et al., "Polymer Electrolytes," 2013, pp. 503-525, vol. 43, Annual Review of Materials Research.
Kuan, W.F., et al., "Design and synthesis of network-forming triblock copolymers using tapered block interfaces," 2012, pp. 519-523, vol. 1, ACS Macro Letters.
Quartarone, E., et al., "Electrolytes for solid-state lithium rechargeable batteries: recent advances and perspectives," 2011, pp. 2525-2540, vol. 40, Chemical Society Reviews.
Roy, R., et al., "Double-gyroid network morphology in tapered diblock copolymers," 2011, pp. 3910-3915, vol. 44(10), Macromolecules.
Soo, P.P., et al., "Rubbery block copolymer electrolytes for solid-state rechargeable lithium batteries," 1999, pp. 32-37, 146(1), Journal of the Electrochemical Society.
Young, W.S., et al., "Block copolymer electrolytes for rechargeable lithium batteries," 2014, pp. 1-16, vol. 52, Journal of Polymer Science, Part B: Polymer Physics.

* cited by examiner

Primary Examiner — Jeffrey C Mullis
(74) Attorney, Agent, or Firm — RatnerPrestia

(57) ABSTRACT

Copolymers useful as components of polymer electrolytes are provided in which the copolymer comprises at least one block sequence represented by formula (I):

$$A\text{—}(T)\text{—}B \qquad (I)$$

wherein A is a vinyl aromatic block, T is a tapered copolymer region copolymerized from a vinyl aromatic monomer and an oligo(oxyalkylene) acrylate monomer and B is an oligo(oxyalkylene) acrylate block.

21 Claims, 2 Drawing Sheets

US 9,935,332 B2

TAPERED BLOCK COPOLYMER ELECTROLYTES

CROSS-REFERENCE TO RELATED APPLICATION

This application claims priority to U.S. Provisional Application No. 61/924,922, filed Jan. 8, 2014, the disclosure of which is incorporated herein by reference in its entirety for all purposes.

STATEMENT AS TO RIGHTS TO INVENTIONS MADE UNDER FEDERALLY SPONSORED RESEARCH AND DEVELOPMENT

This invention was made with government support under Grant No. FA9550-09-1-0706 awarded by the Department of Defense (AFOSR). The government has certain rights in the invention.

FIELD OF THE INVENTION

The invention relates to block copolymers useful as components of polymer electrolytes in electrochemical devices such as rechargeable lithium batteries and the like. The block copolymers contain at least one tapered copolymer region comprised of at least two different monomers.

DISCUSSION OF THE RELATED ART

Most contemporary lithium ion batteries utilize liquid-based electrolytes. Although organic solvents generally offer improved ionic conductivity compared to solvent-free electrolytes, liquid electrolytes based on organic solvents are volatile at elevated temperatures, rendering them thermally and electrochemically unstable. These safety concerns have promoted interest in solid-state lithium batteries containing solvent-free electrolytes.

Block copolymers are promising materials for alternative electrolytes in electronic devices due to their ability to self-assemble into periodically ordered structures. Such nanostructured block copolymers permit simultaneous control over both ionic transport and mechanical strength, thus providing an enticing opportunity to fabricate designer materials for polymer electrolytes. For block copolymer electrolytes to be implemented in commercial lithium battery applications, fast processing and well-ordered structures are required. However, high molecular weight materials, which offer high ionic conductivity and mechanical strength in electrolyte systems, tend to decrease the overall processability of the materials. It has been established that from the standpoint of increasing processability (reducing the order-disorder transition temperature, $T_{ODT}$), tapered block copolymers are ideal. Introducing a transition region between two pure blocks that tapers from one component to another provides an efficient way to decouple the processing temperatures from the copolymer molecular weight (i.e., mechanical properties and conductivity). This means that the $T_{ODT}$ can be controlled independently of molecular weight through the use of tapered interfaces.

BRIEF SUMMARY OF THE INVENTION

The present invention is directed to block copolymers with tapered interfaces between the copolymer blocks which are useful in polymer electrolytes, particularly solid polymer electrolytes containing one or more conductive salts. The tapered interfaces can impact the glass transition temperatures ($T_g$s) in block copolymer electrolytes, thus affecting the polymer chain mobility and the ion transport. The tapered block-containing copolymers can be synthesized via various polymerization techniques such as anionic polymerization and atom transfer radical polymerization (ATRP). The tapered profiles can be generated in various forms including, but not limited to, normal, inverse, sinusoidal, exponential, and sawtooth. The tapered materials can be diblock copolymers with one tapered interface between two blocks as well as multiblock copolymers with two or more tapered interfaces and multiple A blocks and/or multiple B blocks. The tapered interfaces can be prepared via various techniques such as, but not limited to, semi-batch synthesis, wherein the taper sequence, the taper composition profile, and the taper length can be modified as may be desired to fabricate designer materials for various applications. The introduction of tapered interfaces to such block copolymers can decrease the segregation strength between pure blocks of dissimilar monomers, thus enabling the manipulation of polymer phase behaviors without changing block chemistry. In particular, the salt-doped tapered block copolymers can exhibit similar or even improved ionic conductivity compared to salt-doped non-tapered analogous block copolymers with greatly reduced (and controllable) processing temperatures. Such materials may be used as components of electrolytes in energy generation and storage devices.

In this invention a tapered interface between pure blocks is generated to decouple polymer interfacial interactions from molecular weight and chemical constituents. Thus, the tapered block copolymers of the present invention can be used to create high molecular weight polymer electrolytes, providing improved mechanical properties, while retaining a processability similar to that of lower molecular weight materials. Additionally, the salt-doped tapered block copolymers are capable of exhibiting improved ionic conductivity as compared to that of salt-doped diblock copolymers that do not contain a tapered interface. These characteristics make it possible to modify the copolymer composition profile between two blocks, manipulating the polymer interfacial interactions while enhancing the ion transport.

One aspect of the invention provides a copolymer comprising at least one block sequence represented by formula (I):

A—(T)—B  (I)

wherein A is a vinyl aromatic block, T is a tapered copolymer region copolymerized from a vinyl aromatic monomer and an oligo(oxyalkylene) acrylate monomer and B is an oligo(oxyalkylene) acrylate block.

The copolymers of the present invention thus may be considered to contain a transition region (the tapered copolymer region T) having a gradient compositional profile which is positioned between two "pure" blocks (the vinyl aromatic block A and the oligo(oxyalkylene) acrylate block B). This architecture differs from that of gradient copolymers, which have a graded compositional profile extending along the entire polymer chain.

For example, the tapered copolymer region may have a first end coupled to the vinyl aromatic block and a second end coupled to the oligo(oxyalkylene) acrylate block and the content of vinyl aromatic monomer in the tapered copolymer region varies gradually from the first end to the second end. The tapering profile in the tapered copolymer region may show a decreasing content of vinyl aromatic monomer in the direction from A to B, for example (a "normal" taper). A normal tapered region will be relatively rich in vinyl aromatic monomer repeating units in sections of the tapered region close to the site of coupling to the adjacent vinyl aromatic block, but relatively rich in oligo(oxyalkylene) acrylate repeating units in sections of the tapered region close to the adjacent oligo(oxyalkylene) acrylate block.

In another embodiment, the tapering profile in the tapered copolymer region may show an increasing content of vinyl aromatic monomer in the direction from A to B (an "inverse" taper). An inverse tapered region will be relatively rich in oligo(oxyalkylene) acrylate repeating units in sections of the tapered region close to the site of coupling to the adjacent vinyl aromatic block, but relatively rich in vinyl aromatic monomer repeating units in sections of the tapered region close to the adjacent oligo(oxyalkylene) acrylate block.

FIG. 1 illustrates, in schematic form, the structures of a conventional diblock copolymer (a), a normal tapered block copolymer (b) and an inverse tapered block copolymer (c).

The vinyl aromatic block may be a homopolymer of a vinyl aromatic monomer. The vinyl aromatic monomer may be styrene. The vinyl aromatic block may be obtained by polymerization of a vinyl aromatic monomer which is the same as the vinyl aromatic monomer of the tapered copolymer region. Generally speaking the vinyl aromatic block is relatively rigid as compared to the oligo(oxyalkylene) acrylate block, with a higher glass transition temperature ($T_g$) than that of the oligo(oxyalkylene) acrylate block.

The oligo(oxyalkylene) acrylate block is ion-conductive, in contrast to the vinyl aromatic block. In one aspect of the invention, the oligo(oxyalkylene) acrylate block is a homopolymer of an oligo(oxyalkylene) acrylate monomer, which may be the same as or different from the oligo(oxyalkylene) acrylate monomer of the tapered copolymer region. The oligo(oxyalkylene) acrylate may, for example, be represented by formula (IIa):

$$R^1R^2C\!=\!C(R^3)C(\!=\!O)O\!-\!(CHR^{4a}CHR^{4b}\!-\!O)_m\!-\!R^5 \qquad (IIa)$$

wherein $R^1$, $R^2$ and $R^3$ each represent, independently, a hydrogen atom or a hydrocarbon group of C1 to C10, $R^1$ and $R^3$ may be bonded together to form a ring, $R^{4a}$ and $R^{4b}$ each represent, independently, a hydrogen atom or a methyl group, $R^5$ represents a hydrogen atom, a hydrocarbon group, an acyl group, or a silyl group, m represents an integer from 2 to 100, and individual $R^{4a}$ and $R^{4b}$ groups are either identical or different.

The copolymer, in one aspect of the invention, may have a taper volume fraction of from 0.25 to 0.75 (the balance to 1 being the total combined volume fraction of the vinyl aromatic block(s) and the oligo(oxyalkylene) acrylate block(s)). In another aspect, the copolymer may have an overall vinyl aromatic monomer volume fraction content of from 0.25 to 0.75 (the balance to 1 being the total combined volume fraction of the oligo(oxyalkylene) acrylate monomer present in the tapered and oligo(oxyalkylene) acrylate block segments of the copolymer).

In another embodiment, the oligo(oxyalkylene) acrylate monomer may be represented by formula (IIb)

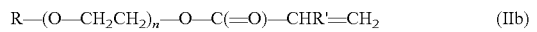

$$R\!-\!(O\!-\!CH_2CH_2)_n\!-\!O\!-\!C(\!=\!O)\!-\!CHR'\!=\!CH_2 \qquad (IIb)$$

wherein n is an integer of 2 to 20, R is H or a C1-C6 alkyl group, and R' is H or $CH_3$.

The copolymer of the present invention may additionally comprise at least one additional block sequence represented by formula (III):

$$-\!(T^2)\!-\!A^2 \qquad (III)$$

wherein $A^2$ is a vinyl aromatic block which is the same as or different from vinyl aromatic block A and $T^2$ is a tapered copolymer region copolymerized from a vinyl aromatic monomer and an oligo(oxyalkylene) acrylate monomer which is the same as or different from tapered copolymer region T and $T^2$ is bonded to oligo(oxyalkylene) (meth) acrylate block B. In this context, "different from" may refer to one or more characteristics such as monomer content and/or chain length.

In another embodiment, the copolymer may additionally comprise at least one additional block sequence represented by formula (IV):

$$B^2\!-\!(T^2)\!- \qquad (IV)$$

wherein $B^2$ is an oligo(oxyalkylene) acrylate block which is the same as or different from oligo(oxyalkylene) acrylate block B and $T^2$ is a tapered copolymer region copolymerized from a vinyl aromatic monomer and an oligo(oxyalkylene) acrylate monomer which is the same as or different from tapered copolymer region T and $T^2$ is bonded to vinyl aromatic block A.

Also provided by the present invention is a polymer electrolyte comprising at least one copolymer in accordance with any of the above-mentioned embodiments and at least one salt. The at least one salt may include at least one lithium salt.

A still further aspect of the invention provides an electrochemical device comprising an electrode in electrical contact with the aforementioned polymer electrolyte.

Living or reversible-deactivation polymerization techniques may be utilized to produce copolymers in accordance with the present invention. A suitable method for preparing a copolymer may comprise the following steps:

a) polymerizing a first monomer to provide a first macroinitiator comprising a block of the first monomer;

b) reacting the first monomer and a second monomer, which is different from the first monomer, with the first macroinitiator under conditions effective to polymerize the first monomer and second monomer and to provide a second macroinitiator comprised of a tapered region coupled to the block of the first monomer, wherein the first macroinitiator is present in a reaction mixture to which the first monomer and second monomer are added over a period of time and wherein the ratio of the rate of addition of the first monomer to the rate of addition of the second monomer is varied over the period of time; and c) reacting the second monomer with the second macroinitiator under conditions effective to polymerize the second monomer to form a block of the second monomer coupled to the tapered copolymer region;

wherein the first monomer is a vinyl aromatic monomer or an oligo(oxyalkylene) acrylate monomer and the second monomer is a vinyl aromatic monomer if the first monomer is an oligo(oxyalkylene) acrylate monomer and an oligo(oxyalkylene) acrylate monomer if the first monomer is a vinyl aromatic monomer.

In another embodiment, copolymers in accordance with the invention may be prepared by a method comprising the steps of:

a) polymerizing a first vinyl aromatic monomer to provide a first macroinitiator comprising vinyl aromatic block A;

b) reacting a second vinyl aromatic monomer, which may be the same as or different from the first vinyl aromatic monomer, and a first oligo(oxyalkylene) acrylate monomer with the first macroinitiator to provide a second macroinitiator comprised of tapered copolymer region T coupled to vinyl aromatic block A, wherein the first macroinitiator is present in a reaction mixture to which the second vinyl aromatic monomer and first oligo(oxyalkylene) acrylate monomer are added over a period of time and wherein the ratio of the rate of addition of second vinyl aromatic monomer to the rate of addition of the first oligo(oxyalkylene) acrylate monomer is varied over the period of time, wherein the second macroinitiator comprises a block sequence represented by structure A-(T);

c) reacting a second oligo(oxyalkylene) acrylate monomer, which may be the same as or different from the first oligo(oxyalkylene) acrylate monomer, with the second macroinitiator to form an oligo(oxyalkylene) acrylate block B coupled to tapered copolymer region T and thereby obtain the copolymer.

Steps a)-c) may, for example, be carried out using one or more polymerization techniques selected from anionic polymerization and atom transfer radical polymerization (ATRP). At least one of the first macroinitiator or second macroinitiator may be isolated and purified before proceeding with subsequent step b) or c). In one aspect of the invention, the second vinyl aromatic monomer and the first oligo(oxyalkylene) acrylate monomer may be added to the reaction mixture using metered pumping during step b).

DETAILED DESCRIPTION OF CERTAIN EMBODIMENTS OF THE INVENTION

Vinyl Aromatic Monomer

Figure 1:
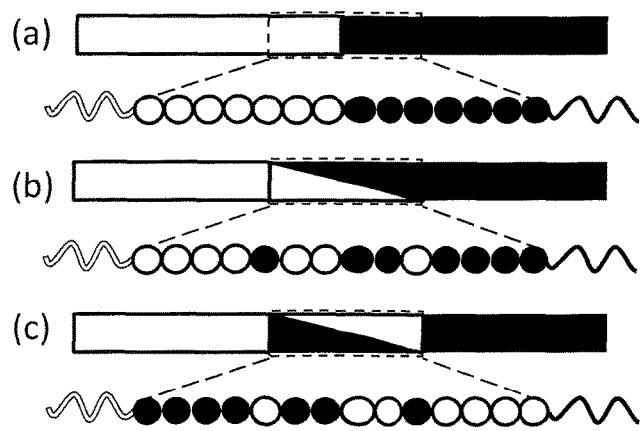
FIG. 1 illustrates, in schematic form, the structures of a conventional diblock copolymer (a), a normal tapered block copolymer (b) and an inverse tapered block copolymer (c).

A vinyl aromatic monomer (or combination of such monomers) is used, in combination with an oligo(oxyalkylene) acrylate monomer as further described below, to prepare the tapered copolymer region portion(s) (T) of the copolymer of the present invention. Additionally, a vinyl aromatic monomer (or combination of such monomers) is employed in the preparation of the vinyl aromatic block polymer portion(s) A of the copolymer of the present invention. In one embodiment of the invention, the same vinyl aromatic monomer (or combination of vinyl aromatic monomers) is used in both the tapered copolymer region and the vinyl aromatic block.

In one embodiment of the invention, a single type of vinyl aromatic monomer is present (in polymerized form) within each tapered copolymer region portion (T) of the copolymer. Where the copolymer contains a plurality of tapered copolymer region portions, each portion may contain the same vinyl aromatic monomer. In one embodiment, however, the tapered copolymer region portions may differ from each other with respect to the particular vinyl aromatic monomer used. For example, where the copolymer contains three tapered copolymer regions $T^1$, $T^2$ and $T^3$, each of the blocks may be based on the same vinyl aromatic monomer; alternatively, three different vinyl aromatic monomers may be used in $T^1$, $T^2$ and $T^3$. In yet another embodiment, the same vinyl aromatic monomer can be used to prepare $T^1$ and $T^3$, with a different vinyl aromatic monomer being employed for $T^2$.

In one embodiment of the invention, a single type of vinyl aromatic monomer is present (in polymerized form) within each vinyl aromatic block portion (A) of the copolymer. Each vinyl aromatic block portion thus is a homopolymer of the vinyl aromatic monomer. Where the copolymer contains a plurality of vinyl aromatic blocks, each portion may contain the same vinyl aromatic monomer. In one embodiment, however, the blocks may differ from each other with respect to the particular vinyl aromatic monomer used. For example, where the copolymer contains three blocks $A^1$, $A^2$ and $A^3$, each of the blocks may be based on the same vinyl aromatic monomer; alternatively, three different vinyl aromatic monomers may be used in $A^1$, $A^2$ and $A^3$. In yet another illustrative embodiment in which the copolymer contains three blocks $A^1$, $A^2$ and $A^3$, the same vinyl monomer can be used to prepare $A^1$ and $A^3$, with a different vinyl aromatic monomer being employed for $A^2$.

Suitable vinyl aromatic monomers include monomers containing a polymerizable vinyl group (containing a carbon-carbon double bond) to which is attached an aryl or heteroaryl group. For example, the vinyl aromatic monomer may have a structure corresponding to formula (V):

$$R^{10}R^{11}C=CR^{12}R^{13} \qquad (V)$$

wherein $R^{10}$, $R^{11}$ and $R^{12}$ each represent, independently, a hydrogen atom or a hydrocarbon group (e.g., an alkyl group) of C1 to C10 (optionally containing one or more heteroatoms such as halide, S, O, N), and $R^{13}$ represents an aryl or a heteroaryl group. For example, substituents $R^{10}$ to $R^{12}$ may be the same or different from each other and may be hydrogen, a methyl group, an ethyl group, an isopropyl group, an n-butyl group, a sec-butyl group, an isobutyl group, a t-butyl group, a phenyl group, a naphthyl group, or a benzyl group. The group $R^{13}$ may be an aryl group such as a phenyl group, substituted phenyl group, naphthyl group, or anthracenyl group, or a heteroaryl group such as a 2-pyridyl group or 4-pyridyl group. In one embodiment, $R^{10}$, $R^{11}$ and $R^{12}$ are each H.

Furthermore, the groups $R^{10}$, $R^{11}$ and $R^{12}$ may contain at least one substituent group at a suitable carbon atom, and specific examples of suitable substituent groups include, but are not limited to, halogen atoms such as a fluorine atom, chlorine atom, or bromine atom, hydrocarbon groups such as a methyl group, ethyl group, n-propyl group, phenyl group, naphthyl group, or benzyl group, an acyl group such as an acetyl group or a benzoyl group, a group such as a nitrile group, nitro group, methoxy group, or phenoxy group, as well as other groups such as a methylthio group, methylsulfinyl group, methylsulfonyl group, amino group, dimethylamino group, or anilino group. These same types of substituents may be present on the aryl or heteroaryl group of $R^{13}$.

Specific illustrative examples of suitable vinyl aromatic monomers include styrene, o-methylstyrene, p-methylstyrene, p-t-butylstyrene, alpha-methylstyrene, p-t-butoxystyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, 9-vinylanthracene, 2-vinylpyridine, 4-vinylpyridine, 2-vinylquinoline, 4-vinylquinoline, 2-vinylthiophene, and 4-vinylthiophene.

Such vinyl aromatic monomers are incorporated into the tapered copolymer region and vinyl aromatic block portions of the copolymer of the present invention. In polymerized form, they provide repeating units in which the carbon-carbon double bond of the vinyl group has been reacted and incorporated into the backbone of the copolymer. The aryl or heteroaryl portion of the reacted monomer is pendant to the copolymer backbone. For example, where the vinyl aromatic monomer is styrene, the pendant group is a phenyl group and the repeating unit formed corresponds to the following structure: —[CH$_2$CHPh]—, where Ph=phenyl.

Oligo(Oxyalkylene) Acrylate Monomer

An oligo(oxyalkylene) acrylate monomer (or combination of such monomers) is used to prepare the tapered copolymer region portion(s) (T) as well as the oligo(oxyalkylene) acrylate block portion(s) (B) of the copolymer of the present invention. In one embodiment, the same oligo(oxyalkylene) acrylate monomer or combination of such monomers is used in both the tapered copolymer region(s) and the oligo(oxyalkylene) acrylate block portion(s) of the copolymer.

In one embodiment of the invention, a single type of oligo(oxyalkylene) acrylate monomer is present (in polymerized form) within each tapered copolymer region portion (T) of the copolymer. Where the copolymer contains a plurality of tapered copolymer region portions, each portion may contain the same oligo(oxyalkylene) acrylate monomer. In one embodiment, however, the tapered copolymer region portions may differ from each other with respect to the particular oligo(oxyalkylene) acrylate monomer used. For example, where the copolymer contains three tapered copolymer regions $T^1$, $T^2$ and $T^3$, each of the blocks may be based on the same oligo(oxyalkylene) acrylate monomer; alternatively, three different oligo(oxyalkylene) acrylate monomers may be used in $T^1$, $T^2$ and $T^3$. In yet another embodiment, the same oligo(oxyalkylene) acrylate monomer can be used to prepare $T^1$ and $T^3$, with a different oligo(oxyalkylene) acrylate monomer being employed for $T^2$.

In one embodiment of the invention, a single type of oligo(oxyalkylene) acrylate monomer is present (in polymerized form) within each oligo(oxyalkylene) acrylate block (B) of the copolymer. That is, each oligo(oxyalkylene) acrylate block may be a homopolymer. Where the copolymer contains a plurality of oligo(oxyalkylene) acrylate blocks, each portion may contain the same oligo(oxyalkylene) acrylate monomer. In one embodiment, however, the oligo(oxyalkylene) acrylate blocks may differ from each other with respect to the particular oligo(oxyalkylene) acrylate monomer used. For example, where the copolymer contains three oligo(oxyalkylene) acrylate blocks $B^1$, $B^2$ and $B^3$, each of the blocks may be based on the same oligo(oxyalkylene) acrylate monomer; alternatively, three different oligo(oxyalkylene) acrylate monomers may be used in $B^1$, $B^2$ and $B^3$. In yet another illustrative embodiment, the same oligo(oxyalkylene) acrylate monomer can be used to prepare $B^1$ and $B^3$, with a different oligo(oxyalkylene) acrylate monomer being employed for $B^2$.

Suitable oligo(oxyalkylene) acrylate monomers include esters of alpha, beta-unsaturated carboxylic acids (such as acrylic acid, methacrylic acid and the like) wherein the carboxylic acid has been esterified with a moiety containing a plurality of oxyalkylene units. For example, the oligo(oxyalkylene) acrylate monomer may be represented by formula (IIa):

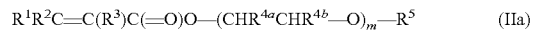

$$R^1R^2C=C(R^3)C(=O)O-(CHR^{4a}CHR^{4b}-O)_m-R^5 \quad (IIa)$$

wherein $R^{10}$, $R^2$ and $R^3$ each represent, independently, a hydrogen atom or a hydrocarbon group of C1 to C10, $R^1$ and $R^3$ may be bonded together to form a ring, $R^{4a}$ and $R^{4b}$ each represent, independently, a hydrogen atom or a methyl group, $R^5$ represents a hydrogen atom, a hydrocarbon group, an acyl group, or a silyl group, m represents an integer from 2 to 100, and individual $R^{4a}$ and $R^{4b}$ groups are either identical or different. In one embodiment of the invention the oligo(oxyalkylene) acrylate monomer is an oligo(oxyethylene) (meth)acrylate monomer.

In another aspect of the invention, the oligo(oxyalkylene) acrylate monomer is represented by formula (IIb):

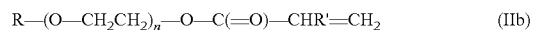

$$R-(O-CH_2CH_2)_n-O-C(=O)-CHR'=CH_2 \quad (IIb)$$

wherein n is an integer of 2 to 20, R is H or a C1-C6 alkyl group, and R' is H or $CH_3$.

In one embodiment, the oligo(oxyalkylene) acrylate monomer is methoxyoligooxyalkylene methacrylate, wherein in formula (IIb) R=methyl, n=7-10, and R' is methyl.

Such monomers are incorporated into the tapered copolymer region and oligo(oxyalkylene) acrylate block portions of the copolymer of the present invention. In polymerized form, they provide repeating units in which the carbon-carbon double bond has been reacted and incorporated into the backbone of the copolymer. The oligo(oxyalkylene) portion of the reacted monomer is pendant to the copolymer backbone. For example, where the oligo(oxyalkylene) acrylate monomer corresponds to formula (IIb), the pendant group has structure R—(O—CH$_2$CH$_2$)$_n$—O—C(=O)—.

Illustrative examples of compounds suitable for use as oligo(oxyalkylene) acrylate monomers include, but are not limited to, methoxy polyethylene glycol (meth)acrylate (in which the number of ethylene glycol units is from 2 to 100), ethoxypolyethylene glycol (meth)acrylate, phenoxypolyethylene glycol (meth)acrylate, methoxypolypropylene glycol (meth)acrylate (in which the number of propylene glycol units is from 2 to 100), ethoxypolypropylene glycol (meth)acrylate, phenoxypolypropylene glycol (meth)acrylate, polyethylene glycol mono(meth)acrylate, polypropylene glycol mono(meth)acrylate, polyethylene glycol-polypropylene glycol mono(meth)acrylate, octoxypolyethylene glycol-polypropylene glycol mono(meth)acrylate, lauroxypolyethylene glycol mono(meth)acrylate, stearoxypolyethylene glycol mono(meth)acrylate, acetyloxypolyethylene glycol (meth)acrylate, benzoyloxypolyethylene glycol (meth)acrylate, trimethylsilyloxypolyethylene glycol (meth)acrylate, t-butyldimethylsilyloxypolyethylene glycol (meth)acrylate, methoxypolyethylene glycol cyclohexene-1-carboxylate, and methoxypolyethylene glycol cinnamate.

Arrangement of Copolymer Blocks

As previously mentioned, the copolymers of the present invention are characterized by having block structures containing at least one block sequence represented by formula (I):

A—(T)—B     (I)

wherein A is a vinyl aromatic block polymer, T is a tapered copolymer region copolymerized from a vinyl aromatic monomer and an oligo(oxyalkylene) acrylate monomer and B is an oligo(oxyalkylene) acrylate block.

However, also included within the scope of the invention are copolymers containing one or more additional vinyl aromatic block polymer segments, and/or one or more additional oligo(oxyalkylene) acrylate block segments, and/or one or more additional tapered copolymer regions copolymerized from a vinyl aromatic monomer and an oligo(oxyalkylene) acrylate monomer, in addition to the A, T and B segments set forth in formula (I). In one embodiment, the copolymer additionally comprises a second tapered copolymer region coupled (bonded) to vinyl aromatic block A. This second tapered copolymer region may optionally be coupled to a second oligo(oxyalkylene) acrylate block. In another embodiment, the copolymer additionally comprises a second tapered copolymer region coupled to oligo(oxyalkylene) acrylate block B. This second tapered copolymer region may be coupled to a second vinyl aromatic block. It is also possible for the copolymer to contain A blocks and B blocks coupled directly to each other (i.e., without an intervening tapered copolymer region T). Further, the copolymer may contain two A blocks coupled to each other through a tapered copolymer region T and/or two B blocks coupled to each other through a tapered copolymer region T.

Thus, in various embodiments of the invention, the copolymer may comprise one, two, three, four or more vinyl aromatic blocks, one, two, three, four or more oligo(oxyalkylene) acrylate blocks, and one, two, three, four or more tapered copolymer regions.

Illustrative examples of copolymers within the scope of the present invention may be represented as follows, where $A^1$, $A^2$ and $A^3$ are vinyl aromatic blocks, $B^1$ and $B^2$ are oligo(oxyalkylene) acrylate blocks, and $T^1$, $T^2$, $T^3$ and $T^4$ are tapered copolymer regions.

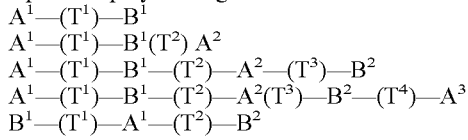

$A^1$—($T^1$)—$B^1$
$A^1$—($T^1$)—$B^1$($T^2$) $A^2$
$A^1$—($T^1$)—$B^1$—($T^2$)—$A^2$—($T^3$)—$B^2$
$A^1$—($T^1$)—$B^1$—($T^2$)—$A^2$($T^3$)—$B^2$—($T^4$)—$A^3$
$B^1$—($T^1$)—$A^1$—($T^2$)—$B^2$

In the above illustrative examples of tapered block copolymers in accordance with the present invention, each of the A blocks ($A^1$, $A^2$, $A^3$) may be the same as or different from each other with respect to monomer composition and/or molecular weight. Likewise, each of the B blocks ($B^1$, $B^2$) may be the same as or different from each other with respect to monomer composition and/or molecular weight. The tapered copolymer regions ($T^1$, $T^2$, $T^3$, $T^4$) may be the same as or different from each other with respect to monomer composition, molecular weight, and direction of tapering (normal or inverse, for example).

The overall molar ratio of vinyl aromatic monomer to oligo(oxyalkylene) acrylate monomer in the copolymer is not believed to be particularly critical and may be, for example, within a range from 1/30 to 30/1, a range from 1/20 to 20/1, or a range from 1/10 to 10/1.

Although there are no particular restrictions on the number average molecular weight of a copolymer of the present invention, values within a range from 5,000 to 1,000,000 g/mol are preferred. For example, the copolymer number average molecular weight may be from 20,000 to 50,000 g/mol. If the number average molecular weight is less than 5,000 g/mol, then the thermal characteristics and physical characteristics may tend to deteriorate, whereas if the value exceeds 1,000,000 g/mol, the moldability and film forming characteristics may tend to deteriorate. Furthermore, although there are no particular restrictions on the ratio ($M_w/M_n$) between the weight average molecular weight ($M_w$) and the number average molecular weight ($M_n$) of the copolymer, generally it will be preferred to have a relatively low ratio (dispersity), such as a ratio within a range from 1.01 to 2.50 or a ratio within a range from 1.01 to 1.50.

The number average molecular weights of the individual blocks or segments in the copolymer are also not thought to be especially critical and may be, for example, within a range of 2,000 to 50,000 g/mol. In one embodiment, the number average molecular weight of the vinyl aromatic monomer block is 5,000 to 25,000 g/mol, the number average molecular weight of the tapered copolymer region is 5,000 to 25,000 g/mol, and the number average molecular weight of the oligo(oxyalkylene) acrylate block is 2,000 to 15,000 g/mol.

The aforementioned blocks and segments may be bonded together directly, but alternatively may be bonded together via other structural units such as linkage groups (e.g., an oxygen atom or an alkylene group).

The vinyl aromatic block portion(s) of the copolymer may be characterized as being essentially free or entirely free of any polymerized units of oligo(oxyalkylene) acrylate monomer. In one aspect, the vinyl aromatic block portion(s) contain only polymerized units of one or more types of vinyl aromatic monomer. However, in other embodiments of the invention, it is possible for the vinyl aromatic blocks to contain relatively small amounts (e.g., up to about 20 weight %) of polymerized units of monomers other than vinyl aromatic monomers such as, for example, dienes, acrylonitrile, olefins and the like.

The oligo(oxyalkylene) acrylate block portion(s) of the copolymer may be characterized as being essentially free or entirely free of any polymerized units of vinyl aromatic monomer. In one aspect, the oligo(oxyalkylene) acrylate block portion(s) contain only polymerized units of one or more types of oligo(oxyalkylene) acrylate monomer. However, in other embodiments of the invention, it is possible for the oligo(oxyalkylene) acrylate blocks to contain relatively small amounts (e.g., up to about 20 weight %) of polymerized units of monomers other than oligo(oxyalkylene) acrylate monomers such as, for example, hydroxyalkyl esters of (meth)acrylic acid, (meth)acrylic acid, mono(oxyalkylene) acrylates and the like.

As used herein, the term "tapered" in reference to the segment (T) positioned between vinyl aromatic block A and oligo(oxyalkylene) acrylate block B means that over the length of such segment (T) the relative proportions of vinyl aromatic monomer repeating units and oligo(oxyalkylene) acrylate monomer repeating units vary. Such variance may occur in a gradual way or in a stepwise fashion and may be controlled as may be desired by varying the rate at which each of the monomers is introduced during the polymerization step which forms the tapered copolymer region, as described below in more detail.

The tapered copolymer region may have a first end coupled to a vinyl aromatic block and a second end coupled to an oligo(oxyalkylene) acrylate block, wherein the content of vinyl aromatic monomer in the tapered copolymer region decreases gradually from the first end to the second end (a "normal" taper). Thus, the tapering profile in the tapered copolymer region may show a decreasing content of vinyl aromatic monomer in the direction from A to B.

In another embodiment, the tapered copolymer region has a first end coupled to the vinyl aromatic block and a second end coupled to the oligo(oxyalkylene) acrylate block and the content of vinyl aromatic monomer in the tapered copolymer region increases gradually from the first end to the second end (an "inverse" taper). Thus, in this embodiment the tapering profile in the tapered copolymer region shows an increasing content of vinyl aromatic monomer in the direction from A to B.

The copolymer, in various aspects of the invention, may have a taper volume fraction of at least 0.1, at least 0.15, at least 0.2 or at least 0.25 or at least 0.3 (the balance to 1 being the total combined volume fraction of the vinyl aromatic block(s) and the oligo(oxyalkylene) acrylate block(s)). In other aspects of the invention, the copolymer may have a taper volume fraction of not more than 0.9, not more than 0.85, not more than 0.8, not more than 0.75, or not more than 0.7. In one embodiment, the taper volume fraction is from 0.25 to 0.75 (the balance to 1 being the total combined volume fraction of the vinyl aromatic block(s) and the oligo(oxyalkylene) acrylate block(s)). The taper volume fraction is calculated from the taper weight fraction and the densities of vinyl aromatic component and oligo(oxyalkylene) acrylate component in the tapered region. The taper weight fraction can be determined via a combination of gel permeation chromatography (GPC) and proton nuclear magnetic resonance ($^1$H NMR).

The copolymer, in various aspects of the invention, may have an overall vinyl aromatic monomer volume fraction of at least 0.1, at least 0.15, at least 0.2 or at least 0.25, at least 0.3, at least 0.35, or at least 0.4 (the balance to 1 being the total combined volume fraction of the oligo(oxyalkylene) acrylate monomer present in the tapered and oligo(oxyalkylene) acrylate block segments of the copolymer). "Overall" means the total amount of vinyl aromatic monomer incorporated in both the tapered segment(s) and the vinyl aromatic block(s) of the copolymer. In other aspects of the invention, the copolymer may have an overall vinyl aromatic monomer volume fraction of not more than 0.9, not more than 0.85, not more than 0.8, not more than 0.75, not more than 0.7, not more than 0.65, not more than 0.6, or not more than 0.55. In one aspect of the invention, the copolymer may have an overall vinyl aromatic monomer volume fraction content of from 0.25 to 0.75 (the balance to 1 being the total combined volume fraction of the oligo(oxyalkylene) acrylate monomer present in the tapered and oligo(oxyalkylene) acrylate block segments of the copolymer). The overall aromatic monomer volume fraction is determined by $^1$H NMR.

Generally speaking, it will be desirable for the copolymer to have a relatively low dispersity (sometimes also referred to as polydispersity index and calculated by dividing the weight average molecular weight by the number average molecular weight). For example, the dispersity of the copolymer in various embodiments of the invention may be less than 1.5, less than 1.4, less than 1.3 or less than 1.2.

In one desirable embodiment of the invention, the composition of the copolymer (e.g., the vinyl aromatic and oligo(oxyalkylene) acrylate monomers used to prepare the copolymer, the molecular weight characteristics of the overall copolymer and the individual blocks or segments) is selected so as to provide a copolymer that is solid at room temperature and thermoplastic.

Methods for Producing the Copolymer

Copolymers in accordance with the invention may be produced by sequential polymerization of the above-described monomers, using methods such as a reversible-deactivation radical polymerization that employs a transition metal complex as the catalyst and an organohalogen compound comprising one or more halogen atoms as the polymerization initiator (also known in the art as an atom transfer radical polymerization (ATRP) or a transition metal-mediated radical polymerization), a reversible-deactivation radical polymerization using a stable radical (also known in the art as stable free radical mediated polymerization), or a living anionic polymerization. Of these, a reversible-deactivation radical polymerization using a transition metal complex as the catalyst and an organohalogen compound comprising one or more halogen atoms as the polymerization initiator (which may take the form of a macroinitiator) is particularly suitable. Combinations of the aforementioned polymerization techniques may also be used, wherein one block is prepared using one method and the other blocks prepared using different methods. For example, a halide-terminated vinyl aromatic polymer may be prepared by a living anionic polymerization and then employed as a macroinitiator in a reversible-deactivation radical polymerization, or vice versa.

In a tapered diblock copolymer system, for example, a homopolymer block is first synthesized and then used as a macroinitiator for the semi-batch synthesis of the tapered region of the desired copolymer. During synthesis of the tapered region, the macroinitiator is charged to a reactor vessel and activated, with the two monomers to be incorporated into the tapered region of the copolymer then added to the reactor vessel at predetermined flow rates using, for example, automated syringe pumps or other suitable means for separately controlling the introduction of the two monomers such as metered pumping. The reactivity ratios of the two different monomers (Monomer 1 and Monomer 2) may be calculated using Mayo-Lewis relationship to select the flow rates for each monomer and the tapered region composition profile in the final copolymer. In one embodiment, Monomer 1 is a vinyl aromatic monomer and the initially synthesized homopolymer block is a homopolymer of a vinyl aromatic monomer, with Monomer 2 being an oligo(oxyalkylene) acrylate monomer. In another embodiment, Monomer 1 is an oligo(oxyalkylene) acrylate monomer and the initially synthesized homopolymer block is a homopolymer of an oligo(oxyalkylene) acrylate monomer, with Monomer 2 being a vinyl aromatic monomer.

The compositional profile of the tapered region may be controlled as may be desired for a particular end-use application. For example, a "normal" taper may be produced by starting the monomer feed during synthesis of the tapered region using a high rate of addition of Monomer 1 relative to the rate of addition of Monomer 2, wherein Monomer 1 is of the same type of monomer utilized to produce the initial homopolymer block and then gradually changing the addition rate of Monomer 1 relative to that of Monomer 2 such that at the end of monomer addition Monomer 2 (which is the same type of monomer to be used in preparing a second homopolymer block) is being added at a rate that is high relative to the addition rate of Monomer 1. An "inverse" taper may be produced by starting the monomer feed using a low addition rate of Monomer 1 relative to the addition rate of Monomer 2, and then gradually changing the feed rate of Monomer 1 relative to the feed rate of Monomer 2 such that at the end of monomer addition the rate at which Monomer 2 is being added is high relative to the rate at which Monomer 2 is being added.

Following completion of the addition of the tapered region monomers and the desired extent of reaction of these monomers, the resulting pure block/tapered region copolymer may thereafter be reacted with a single monomer under appropriate polymerization conditions to form another homopolymer block, which generally is different in composition than the first homopolymer block. In one embodiment, the monomer used in such further polymerization is the same as Monomer 2 used in the preparation of the tapered region.

A reversible-deactivation radical polymerization can be conducted using a transition metal complex as the catalyst and an organohalogen compound comprising one or more halogen atoms within each molecule as the polymerization initiator. Reversible-deactivation radical polymerization methods for preparing block copolymers (without tapered regions) using vinyl aromatic monomers and oligo(oxyalkylene) acrylate monomers are known in the art and may be adapted for use in preparing the tapered copolymers of the present invention (see, for example, US 2005/0256256, incorporated herein by reference in its entirety for all purposes).

The central metal within the transition metal complex may, for example, be manganese, rhenium, iron, ruthenium, rhodium, nickel, or an element from group 7 to 11 of the periodic table such as copper. There are no particular restrictions on the ligands that can be coordinated with the metal to form the metal complex, although examples of such ligands include triarylphosphines, trialkylphosphines, triarylphosphites, halogen atoms, carbon monoxide, hydrogen atoms, hydrocarbon ligands such as cyclopentadiene, cyclohexadiene, cyclooctadiene, cyclooctatetraene, indene, norbornadiene, benzene, cymene, phenol, 4-isopropyltoluene, cyclopentadienyl toluene, indenyl toluene, salicylidene, 2-methylpentene, 2-butene, and allene, furan, and carboxylic acids. Furthermore, nitrogen based ligands are also usable, such as $NH_3$, NO, $NO_2$, $NO_3$, alkylene polyamines such as ethylenediamine and diethylenetriamine, tributylamine, 1,3-diisopropyl-4,5-dimethylimidazol-2-ylidine, pyridine, phenanthroline, diphenanthroline or substituted phenanthroline, 2,2':6',2"-terpyridine, pyridinimine, cross-linked aliphatic diamines, 4,4'-di(5-nonyl)-2,2'-bipyridine, bipyridine with coordinated thiocyanate, O, S, Se or Te, alkyliminopyridine, alkylbipyridinylamine, alkyl substituted tripyridine, di(alkylamino)alkylpyridine, ethylenediaminedipyridine, or tri(pyridinylmethyl)amine. Furthermore, compounds containing two or more of a primary amine functionality, a secondary amine functionality, and a tertiary amine functionality within the same molecule can also be used to form a ligand with a transition metal, e.g., copper. Specific examples of such compounds include diethylenetriamine, triethylenetetramine, tetraethylpentamine, and 4-(2-aminoethyl)piperidine and alkylated derivatives thereof wherein the hydrogen atoms attached to nitrogen are replaced by alkyl groups such as N,N,N',N",N'''-pentamethyldiethyldiethylenetriamine.

Furthermore, the transition metal complex may contain a hydroxyl group, an alkoxy group (such as a methoxy, ethoxy, propoxy, or butoxy group), an acyl group (such as an acetyl or propionyl group), an alkoxycarbonyl group (such as a methoxycarbonyl or ethoxycarbonyl group), a beta-diketone group such as acetylacetonate, a beta-ketoester group such as acetylacetate, a pseudo-halogen group [such as a CN, thiocyanate (SCN), selenocyanate (SeCN), tellurocyanate (TeCN), $SCSN_3$, OCN, ONC, or azide ($N_3$) group], an oxygen atom, or $H_2O$.

The organohalogen compound used in the production of a copolymer of the present invention may, for example, be a compound comprising from 1 to 4, or even more, halogen atoms (such as fluorine, chlorine, bromine, and iodine). This organohalogen compound functions as an initiator for initiating the polymerization reaction by interacting with the transition metal complex to generate radicals. This type of organohalogen compound can be used either singularly, or in a combination of two or more different compounds. There are no particular restrictions on the organohalogen compound. Any of the organohalogen compounds known in the ATRP art may be utilized, such as, for example, propargyl 2-bromoisobutyrate.

Furthermore, reversible-deactivation radical polymerization can also be conducted using stable radicals. Examples of such stable radicals include mixtures of a stable free radical compound and a radical polymerization initiator, or any of the various alkoxyamines.

A stable free radical compound is one that can exist alone as a stable free group at room temperature or under the polymerization conditions, or is able to react with a growing, non-terminated radical during a polymerization reaction, generating a bond that is capable of re-dissociating. Specific examples include compounds capable of generating one or more nitroxide radicals or hydrazyl radicals such as 2,2,6,6-tetramethyl-1-piperidinyloxy (TEMPO), 4-amino-2,2,6,6-tetramethyl-1-piperidinyloxy, 4-hydroxy-2,2,6,6-tetramethyl-1-piperidinyloxy, 4-oxo-2,2,6,6-tetramethyl-1-piperidinyloxy, 4,4'-dimethyl-1,3-oxazolin-3-yloxy, 2,2,5,5-tetramethyl-1-pyrrolidinyloxy, di-t-butylnitroxide, and 2,2-di(4-t-octylphenyl)-1-picrylhydrazyl.

The radical polymerization initiator can be any compound that undergoes decomposition to generate free radicals, and specific examples include azo compounds such as 2,2'-azobisisobutyronitrile, 2,2'-azobis-(2,4-dimethylvaleronitrile), diacyl peroxides such as benzoyl peroxide, ketone peroxides such as methyl ethyl ketone peroxide, peroxyketals such as 1,1-bis(t-butylperoxy)-3,3,5-trimethylcyclohexane, hydroperoxides such as cumene hydroperoxide, dialkyl peroxides such as dicumyl peroxide, and organic peroxides of peroxyesters such as t-butyl peroxypivalate and t-butyl peroxybenzoate. Furthermore, conventional polymerization accelerators such as dimethylaniline or cobalt naphthenate that are commonly combined with organic peroxides can also be used.

There are no particular restrictions on the polymerization method, and conventional methods such as bulk polymerization, solution polymerization, suspension polymerization, or emulsion polymerization can be employed, although solution polymerization is particularly desirable. In those cases where a solution polymerization is used, there are no particular restrictions on the solvent, and suitable solvents include aromatic hydrocarbons (such as benzene, toluene, and xylene), alicyclic hydrocarbons (such as cyclohexane), aliphatic hydrocarbons (such as hexane and octane), ketones (such as acetone, methyl ethyl ketone, and cyclohexanone), ethers (such as tetrahydrofuran, anisole and dioxane), esters (such as ethyl acetate and butyl acetate), amides (such as N,N-dimethylformamide and N,N-dimethylacetamide), sulfoxides (such as dimethyl sulfoxide), alcohols (such as methanol and ethanol), and polyhydric alcohol derivatives (such as ethylene glycol monomethyl ether and ethylene glycol monomethyl ether acetate). These solvents can be used either singularly, or in mixtures of two or more different solvents. The polymerization is typically conducted either under vacuum or in an inert gas atmosphere such as nitrogen or argon, at a temperature within a range from 0 to 200° C., and preferably from 40 to 150° C., and at either normal pressure or under pressurized conditions.

A living anionic polymerization is typically conducted using an alkali metal or an organoalkali metal as the polymerization initiator, either under vacuum or in an inert gas atmosphere such as nitrogen or argon, in an organic solvent, and at a temperature within a range from −100 to 80° C., and preferably from −100 to 40° C. Examples of suitable alkali metals include lithium, potassium, sodium, and cesium, whereas examples of suitable organoalkali metals include alkylated, allylated, or arylated compounds of the above alkali metals. Specific examples include n-butyllithium, sec-butyllithium, t-butyllithium, ethylsodium, lithium biphenyl, lithium naphthalene, lithium triphenyl, sodium naphthalene, alpha-methylstyrene dianion, 1,1-diphenylhexyllithium, and 1,1-diphenyl-3-methylpentyllithium.

Suitable organic solvents include the types of organic solvents typically used in anionic polymerizations, including aromatic hydrocarbons (such as benzene, toluene, and xylene), aliphatic hydrocarbons (such as hexane and octane), alicyclic hydrocarbons (such as cyclohexane and cyclopentane), ketones (such as acetone, methyl ethyl ketone, and cyclohexanone), ethers (such as tetrahydrofuran, dioxane, ethylene glycol dimethyl ether, and diethylene glycol dimethyl ether), anisole, and hexamethyl phosphoramide. Furthermore, other conventional additives, including the alkali metal salts or alkali earth metal salts of mineral acids such as lithium chloride and the like, can also be used for controlling the copolymerization reaction.

In those cases where a compound containing an active hydrogen atom such as a hydroxyl group or a carboxyl group is used in a living anionic polymerization, the active hydrogen atom is first protected using a conventional protective reaction such as a silylation or a conversion to an acetal or tert-butyloxycarbonyl (BOC) protecting group, the polymerization reaction is conducted, and then following polymerization, a deprotection reaction is conducted using either acid or alkali.

Progress of the polymerization reaction, or confirmation of completion of the reaction, can be ascertained easily using techniques such as gas chromatography, liquid chromatography, gel permeation chromatography, membrane osmometry, or NMR. Following completion of the polymerization reaction, the copolymer can be obtained via typical separation and purification methods such as column purification, or by adding the crude product to water or another poor solvent, and then filtering off and drying the precipitated polymer component. Such separation and purification methods may also be employed at intermediate stages of the preparation of the copolymer. For example, a vinyl aromatic polymer bearing at least one functional group (such as a halide) capable of acting as a site of initiation for the polymerization of a tapered copolymer region may be synthesized, isolated and purified prior to being utilized as a macroinitiator in a polymerization reaction with the vinyl aromatic monomer and oligo(oxyalkylene) acrylate monomer used to obtain the tapered copolymer region coupled to the vinyl aromatic polymer.

Polymer Electrolytes

A polymer electrolyte of the present invention comprises at least one copolymer as described above and at least one electrolyte salt. The polymer electrolyte can contain a mixture of two or more copolymers with different structural units, different molecular weights, and/or different types of tapering in the tapered copolymer regions, etc. The polymer electrolyte may also contain one or more types of polymers other than the copolymers described above. In one embodiment, the polymer electrolyte is solid (i.e., solid at room temperature). In another embodiment, the polymer electrolyte is essentially free or free of any volatile substances, such as organic solvents.

There are no particular restrictions on the electrolyte salt used in the present invention, and an electrolyte comprising the ion identified as the most desirable charge carrier can be used, although electrolytes that display a large dissociation constant within the solid polymer electrolyte are preferred. Suitable examples include alkali metal salts (especially lithium salts), quaternary ammonium salts such as $(CH_3)_4NBF_6$, quaternary phosphonium salts such as $(CH_3)_4PBF_6$, transition metal salts such as $AgClO_4$, or protonic acids such as hydrochloric acid, perchloric acid, and fluoroboric acid, and of these, alkali metal salts, quaternary ammonium salts, quaternary phosphonium salts, and transition metal salts are preferred.

Specific examples of suitable electrolyte salts include conventional alkali metal salts such as $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, LiI, $LiBF_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$, KI, $LiCF_3CO_3$, $NaClO_3$, NaSCN, $KBF_4$, $KPF_6$, $Mg(ClO_4)_2$, and $Mg(BF_4)_2$, and these electrolyte salts may be used either singularly, or in mixtures of two or more different salts. Of the above electrolyte salts, lithium salts are particularly preferred.

The quantity added of the electrolyte salt may typically be within a range from 0.005 to 80 mol %, e.g., from 0.01 to 50 mol %, relative to the quantity of alkylene oxide units within the copolymer. Where the salt is a lithium salt, the molar ratio of [alkylene oxide units in the copolymer]:[Li] may be, for example from 2:1 to 100:1. A polymer electrolyte of the present invention can be produced by combining and mixing (complexing) an electrolyte salt with an aforementioned copolymer. There are no particular restrictions on the method used for this process, and suitable methods include a method in which the copolymer and the electrolyte salt are dissolved in a suitable solvent such as tetrahydrofuran, methyl ethyl ketone, acetonitrile, ethanol, or dimethylformamide (with the solvent later being removed), and a method in which the copolymer and the electrolyte salt are mixed together mechanically, either at room temperature or under heat.

Molding the aforementioned solid polymer electrolyte into sheet, membrane, film or other form may be performed using any of the techniques known in the polymer electrolyte art. For example, a sheet-like solid polymer electrolyte can be produced by any of a variety of coating techniques including roll coating, curtain coating, spin coating, dipping, or casting, and using one of these techniques, a film of the solid polymer electrolyte is formed on the surface of a substrate, and the substrate is subsequently removed to yield the solid polymer electrolyte sheet.

A polymer electrolyte of the present invention contains a copolymer comprising polymeric chains A, B, and T. In the composition, the block chain B, because it contains oligo (oxyalkylene) acrylate repeating units, can be considered as a polymer segment that displays ionic conductivity, the block chain A, because it contains repeating units based on vinyl aromatic monomer, can be considered as a polymer segment that displays little or no ionic conductivity, and the tapered chain T, which contains some portion of repeating units based on oligo(oxyalkylene) acrylate monomer as well as some portion of repeating units based on vinyl aromatic monomer, can be considered as a polymer segment that displays intermediate ionic conductivity (i.e., ionic conductivity between that of polymer segments A and B).

In one aspect of the invention, an electrochemical device such as a battery is provided which comprises an electrolyte comprised of at least one copolymer in accordance with the invention and at least one salt and at least one electrode in electrical contact with the electrolyte. For example, a battery may be provided which comprises:
(i) an electrolyte comprising:
    a) a copolymer comprising at least one block sequence represented by formula (I):

A—(T)—B     (I)

wherein A is a vinyl aromatic block, T is a tapered copolymer region copolymerized from a vinyl aromatic monomer and an oligo(oxyalkylene) acrylate monomer and B is an oligo(oxyalkylene) acrylate block;
    b) a salt;
(ii) a negative electrode in electrical contact with the electrolyte;
(iii) a positive electrode in electrical contact with the electrolyte and separated from the negative electrode; and
(iv) an external circuit in electronic communication with the negative electrode and positive electrode.

EXAMPLES

Materials

Styrene monomers (99%, stabilized, Acros Organics) and oligo-oxyethylene methacrylate monomers (OEM, >99%, stabilized, Sigma-Aldrich, average molar mass=475 g/mol) were purified by passage through basic alumina columns. The styrene monomer also was dried by distilling from calcium hydride. Both monomers were degassed by three freeze-pump-thaw cycles before use. Propargyl 2-bromoisobutyrate was synthesized according to literature procedures (yield approx. 80 wt %). Copper (I) bromide (98%, Acros Organics) was purified by stirring in acetic acid for 20 min, filtering, washing twice with cold ethanol, and drying under dynamic vacuum. N,N,N',N'',N'''-pentamethyldiethylenetriamine (99%, Sigma-Aldrich), tetrahydrofuran (THF, >99%, optima, Fischer), and anisole (>99%, Fisher Scientific) were degassed before storing in an argon-filled glove box. Lithium trifluoromethanesulfonate ($LiCF_3SO_3$, 99%, Sigma-Aldrich) was dried at room temperature under dynamic vacuum overnight before being transferred into the glove box.

Synthesis of Tapered Block Copolymers

Poly(styrene-b-oligo(oxyethylene) methacrylate) ["P(S-OEM)"] block copolymer, normal tapered poly(styrene-b-styrene-oligo(oxyethylene) methacrylate-b-oligo(oxyethylene) methacrylate ["P(S-SOEM-OEM)"] block copolymer, and inverse tapered poly(styrene-b-oligo(oxyethylene) methacrylate-styrene-b-oligo(oxyethylene) methacrylate ["P(S-OEMS-OEM)"] block copolymer with comparable molecular weights and compositions were synthesized via atom transfer radical polymerization (ATRP). The tapered interfaces (blocks) were generated through a semi-batch feed using programmable syringe pumps. The polystyrene (PS) block was synthesized at 100° C. using a mixture of catalyst (copper (I) bromide, 0.73 mmol), ligand (N,N,N',N'',N'''-pentamethyldiethylenetriamine, 1.46 mmol), styrene (0.3 mol) and solvent (anisole, 17 mL) using propargyl 2-bromoisobutyrate (0.73 mmol) as initiator. The polymerization reaction proceeded for 8 h and was terminated by cooling at room temperature and exposing to air. The resulting polymer (Br-capped PS, PS-Br) was purified by passage through a neutral alumina column followed by precipitation from methanol. The number-average molar mass ($M_n$) and dispersity (Đ) were determined using GPC on a Viscotek 270Max instrument fitted with Waters Styragel HR1 and HR4 columns in series, operating with THF as the mobile phase, and calibrated using PS standards.

The PS-Br was reinitiated as a macroinitiator for the semi-batch copolymerization of styrene and OEM monomers (to form the tapered segments). The styrene and OEM monomers were added to the reactor vessel at predetermined flow rates using automated syringe pumps. The flow rates used were calculated based on monomer reactivity ratios determined from the Mayo-Lewis relationship (F. R. Mayo and F. M. Lewis, Journal of the American Chemical Society, 1944, 66, 1594-1601).

To confirm the composition profile in the taper, aliquots were taken during the polymerization of the tapered segment and analyzed via $^1$H NMR spectroscopy (Bruker AV-400). The ATRP reaction to form the tapered segment was designed to reach the desired composition and molecular mass at relatively low monomer conversions (≈30%) to maximize the bromine endgroup fidelity. At the end of the taper region polymerization, pure OEM monomer was added to the reactor for the synthesis of the POEM block. Based on the analysis from GPC and NMR, the formation of PS from unreacted styrene monomer during POEM block polymerization was not detected, confirming the generation of tapered block copolymer. The final tapered block copolymer was purified by passage through neutral alumina and precipitation from cold isopropanol. The non-tapered P(S-OEM) block copolymer was synthesized in a similar fashion but with no tapering step. $M_n$, Đ, and POEM volume fraction were characterized via a combination of GPC and $^1$H NMR using homopolymer densities at room temperature ($\rho_{PS}$=1.05 g/cm$^3$, $\rho_{POEM}$=1.22 g/cm$^3$), for which the density of POEM was estimated using group contribution theory. (see D. W. Van Kevelen and K. Te Nijenhuis, in Properties of Polymers (Fourth Edition), eds. D. W. V. Krevelen and K. T. Nijenhuis, Elsevier, Amsterdam, 2009, pp. 71-108). $^1$HNMR δH (400 MHz; CDCl$_3$; Me$_4$Si) 7.2-6.3 (5 H, br m, Ar—H), 4.2 (2 H, br s, CH$_2$, OEM side chain), 3.9-3.5 (br m, CH$_2$, OEM side chain), 3.4 (3 H, s, CH$_3$, OEM side chain), 2.2-0.7 (br m, CH, CH$_2$, CH$_3$, polymer backbone). The characterization results for all samples are listed in Table 1. Normal tapered and inverse tapered samples are denoted as P(S-SOEM-OEM)), and P(S-OEMS-OEM)$_x$, respectively, for which x represents the taper volume fraction.

Preparation of Salt-Doped Samples

Salt-doped polymers were prepared in an argon-filled glove box to prevent moisture uptake. Polymers were dried rigorously before transferred into the glove box. Measured amounts of polymers and LiCF$_3$SO$_3$ were dissolved in anhydrous THF, followed by solvent removal under dynamic vacuum, and then stored in the glove box.

Small Angle X-Ray Scattering (SAXS)

Synchrotron SAXS experiments were conducted on the DND-CAT 5-ID-D beamline at the Advanced Photon Source of Argonne National Laboratory with an incident beam of wavelength λ=0.7293 Å and a Mar CCD detector at a sample-to-detector distance of 8503 mm (APS-SAXS). Lab source SAXS experiments were conducted at the University of Delaware (UD) on a Rigaku SAXS instrument (UD-SAXS) (see W.-S. Young and T. H. Epps, Macromolecules, 2009, 42, 2672-2678). All two-dimensional scattering data were azimuthally integrated, resulting in plots of scattered intensity versus scattering vector, $q=4\pi\lambda^{-1}\sin(\theta/2)$, for which θ is the scattering angle. All SAXS samples were pre-annealed at 120° C. for 2 h, heated to 150° C. for 2 h, and then cooled to 30° C. under dynamic vacuum. APS-SAXS and UD-SAXS data were acquired at 30° C., 120° C., and 150° C. heating ramp with 15 min annealing at each temperature. APS-SAXS experiments were performed under nitrogen flow, and UD-SAXS experiments were conducted under dynamic vacuum.

Transmission Electron Microscopy (TEM)

Block copolymer morphologies were examined on a JEM-3010 TEM. TEM samples were prepared following the same pre-annealing protocol used for the SAXS specimens. Samples were cut into ≈70 nm slices at −120° C. using a cryo Leica Reichart Ultracut S microtome. The TEM was operated at an accelerating voltage of 200 kV. The POEM domain was stained with ruthenium tetroxide ($RuO_4$) vapor at room temperature for ≈60 s to enhance contrast prior to imaging.

AC Impedance Spectroscopy

A Princeton Applied Research PARSTAT 2273 frequency response analyzer with a homemade test cell on a Linkam HFS91 CAP stage was used to conduct ionic conductivity measurements. Polymer specimens were hot-pressed into disks under vacuum in the glove box and then placed into a test cell as described in the literature (W.-S. Young, J. N. L. Albert, A. B. Schantz and T. H. Epps III, Macromolecules, 2011, 44, 8116-8123).

Samples were pre-annealed at 120° C. for 2 h and then cooled to 20° C. at 30° C./min and held for 1 h. The impedance measurements were conducted under dynamic vacuum, and the ionic conductivity was measured on heating. Two impedance measurements were taken at each temperature with 5 min and 8 min annealing times. The first measurement is reported in the text, while the second measurement was used to ensure that the ionic conductivity results were consistent during the annealing. The AC frequency range and voltage amplitude were 0.1-1 MHz and 10 mV, respectively. The bulk resistance of the electrolyte, R, was determined from the high-frequency plateau in the real impedance data, and the ionic conductivity, σ, was calculated using σ=L/(RA), for which L is the sample thickness, and A is the contact area between the sample and the aluminum foil electrode.

Differential Scanning Calorimetry (DSC)

DSC experiments were conducted using a TA Instruments Discovery DSC equipped with an RCS90 cooling accessory. Samples were sealed in aluminum pans and heated through three cooling/heating cycles between −85° C. and 150° C. at 10° C./min under a nitrogen atmosphere. Baseline calibration was performed with sapphire disks, while the temperature and the cell constant were calibrated using an indium standard. The $T_g$ value was determined from the midpoint of the inflection in the third heating trace.

Dynamic Mechanical Analysis (DMA).

DMA was carried out using an ARES-G2 strain-control rheometer (TA Instruments) with 8 mm diameter parallel plates. Pre-annealed samples from conductivity experiments were hot-pressed at 120° C. for 5 min before shear measurements to improve contact between the polymer and the plates. Isothermal frequency sweeps were conducted at 0.8% strain amplitude, within the linear viscoelastic region.

Results and Discussion

The molecular and morphological characterization of non-tapered P(S-OEM), normal tapered P(S-SOEM-OEM)$_{0.62}$, and inverse tapered P(S-OEMS-OEM)$_{0.61}$ block copolymers is reported in Table 1. The morphologies of neat (non-doped) and LiCF$_3$SO$_3$-doped polymers were examined using a combination of SAXS, TEM, and DMA.

TABLE 1

Molecular and Morphological Characterization of Block Copolymers

| Polymer | $f_{taper}$[a] | $M_n$ (kg/mol) | Đ | $f_{PS}$[b] | Phase[c] (neat) | Phase[d] (15:1) |
|---|---|---|---|---|---|---|
| P(S-OEM) | 0 | 35.0 | 1.17 | 0.49 | LAM | HEX |
| P(S-SOEM-OEM)$_{0.62}$ | 0.62 | 33.0 | 1.13 | 0.48 | DIS | HEX |
| P(S-SOEM-OEM)$_{0.32}$ | 0.32 | 31.0 | 1.10 | 0.52 | LAM | LAM |
| P(S-OEMS-OEM)$_{0.61}$ | 0.61 | 32.0 | 1.17 | 0.48 | DIS | HEX |

[a]Taper volume fraction in block copolymers.
[b]Overall PS volume fraction ($f_{PS} = 1 - f_{POEM}$).
[c]Morphology of neat block copolymers. LAM: lamellae; DIS: disordered.
[d]Morphology of salt-doped block copolymers. HEX: hexagonally-packed cylinder.

Figure 2A:
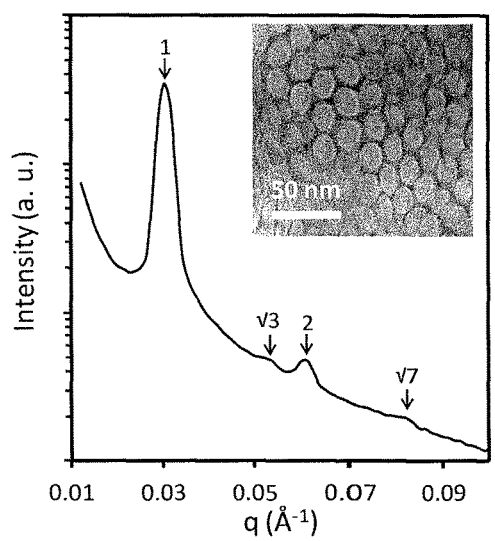
FIG. 2A illustrates the small angle X-ray scattering (SAXS) profile and transmission electron microscopy (TEM) micrograph of salt-doped normal tapered poly(styrene-b-styrene-oligo(oxyethylene) methacrylate-b-oligo (oxyethylene) methacrylate [P(S-SOEM-OEM)] block copolymer with taper volume fraction of 0.62.
Figure 2B:
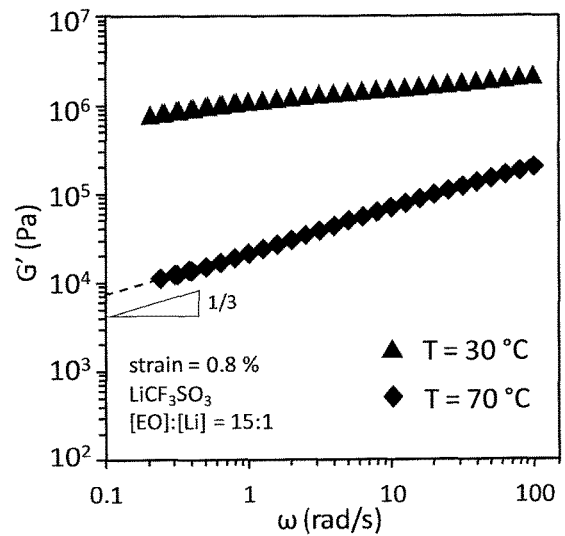
FIG. 2B illustrates the dynamic mechanical analysis (DMA) data for salt-doped P(S-SOEM-OEM)$_{0.62}$ at 30° C. and 70° C.

The neat P(S-OEM) showed an ordered lamellar morphology, while the normal tapered P(S-SOEM-OEM)$_{0.62}$ and inverse tapered P(S-OEMS-OEM)$_{0.61}$ exhibited a disordered phase. This difference in morphology was due to the interfacial modification of the tapered polymers and suggested a lower order-disorder transition temperature ($T_{ODT}$) in the tapered materials relative to their non-tapered counterpart. Upon salt-doping at [EO]:[Li]=15:1, all polymers exhibited hexagonally-packed cylinder (HEX) morphologies. FIG. 2 illustrates the characterization data for normal tapered P(S-SOEM-OEM)$_{0.62}$. SAXS profiles of LiCF$_3$SO$_3$-doped P(S-SOEM-OEM)$_{0.62}$ (FIG. 2(a)) exhibited scattering peaks at q/q*=1, √3, 2, and √7, indicative of HEX morphologies. The TEM micrographs for LiCF$_3$SO$_3$-doped P(S-SOEM-OEM)$_{0.62}$ (FIG. 2(a) inset) with hexagonally-packed dots support the HEX phase assignment. FIG. 2(b) illustrates the DMA data for LiCF$_3$SO$_3$-doped P(S-SOEM-OEM)$_{0.62}$. Salt-doped P(S-SOEM-OEM)$_{0.62}$ presented a solid-like response at 30° C., as evidenced by the nearly frequency-independent modulus. At 70° C., LiCF$_3$SO$_3$-doped P(S-SOEM-OEM)$_{0.62}$ exhibited a terminal response with $G'\propto\omega^{1/3}$, confirming the HEX morphologies.

The domain spacings of LiCF$_3$SO$_3$-doped P(S-SOEM-OEM)$_{0.62}$ and LiCF$_3$SO$_3$-doped P(S-OEMS-OEM)$_{0.61}$ were 20.6 nm and 17.0 nm, respectively, showing a significant deviation from the corresponding non-tapered LiCF$_3$SO$_3$-doped P(S-OEM) ($d_{P(S-OEM):Li}$=34.4 nm), especially for the inverse tapered material. The reduction in d for tapered block copolymers was consistent with theoretical predictions by Hall and co-workers (J. R. Brown, S. W. Sides and L. M. Hall, ACS Macro Letters, 2013, 2, 1105-1109). This result demonstrates that the domain sizes of salt-doped block copolymers can be manipulated independent of the chemical constituents and the polymer molecular mass using tapered interfaces.

Figure 3A:
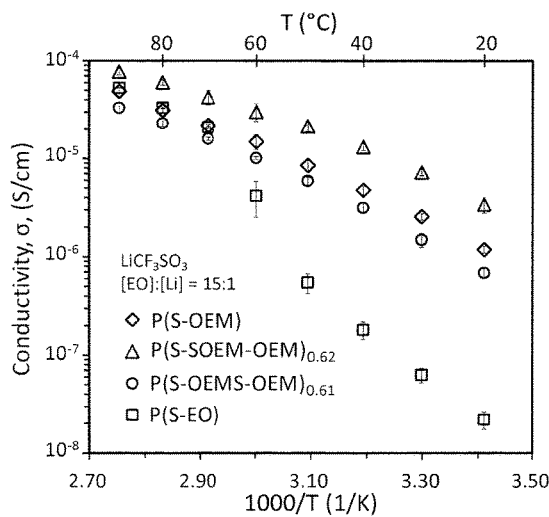
FIG. 3A illustrates the ionic conductivity profiles for poly(styrene-b-oligo(oxyethylene) methacrylate) [P(S-OEM)] block copolymer, normal tapered P(S-SOEM-OEM)$_{0.62}$, inverse tapered poly(styrene-b-oligo(oxyethylene) methacrylate-styrene-b-oligo(oxyethylene) methacrylate [P(S-OEMS-OEM)] block copolymer with taper volume fraction of 0.61, and poly(styrene-b-ethylene oxide) [P(S-EO)] block copolymer at salt-doping ratio of [EO]:[Li]=15:1.

To determine the effects of tapering on the ionic conductivity, AC impedance experiments were conducted on the HEX-forming P(S-OEM), P(S-SOEM-OEM)$_{0.62}$, and P(S-OEMS-OEM)$_{0.61}$ samples at a salt-doping ratio of [EO]:[Li]=15:1. The temperature-dependent conductivity profiles of LiCF$_3$SO$_3$-doped tapered and non-tapered block copolymers are shown in FIG. 3(a). For comparison, the ionic conductivity of a poly(styrene-b-ethylene oxide) [P(S-EO)] sample with HEX morphology at [EO]:[Li]=15:1 also is shown in FIG. 3(a). The ionic conductivity of P(S-EO) dropped substantially below 60° C. due to crystallization of PEO domain. For the POEM-containing specimens, all salt-doped polymers remained amorphous and exhibited higher ionic conductivities over the entire experimental temperature range.

Figure 3B:
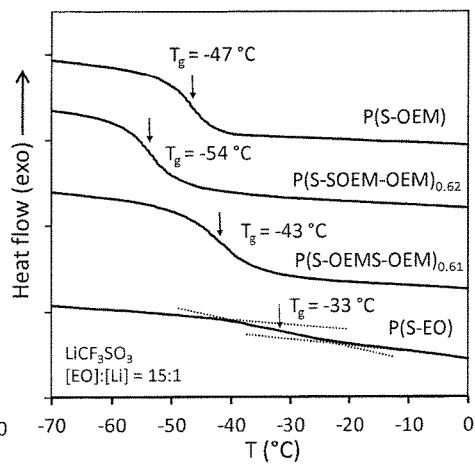
FIG. 3B illustrates the differential scanning calorimetry (DSC) traces of salt-doped polymers in FIG. 3B. The $T_g$s are indicated by arrows.

The conductivity of POEM-based block copolymers was $\sim 10^{-6}$ S/cm at 20° C., which was 2 orders of magnitude higher than P(S-EO) samples ($\sigma_{P(S-EO)} \sim 10^{-8}$ S/cm at 20° C.). Additionally, the POEM-based samples exhibited lower $T_g$s (FIG. 3(b)) in comparison to P(S-EO), suggesting the potential for enhanced segmental motion in POEM domains relative to PEO domains.

Among the three POEM-based block copolymers, the normal tapered P(S-SOEM-OEM)$_{0.62}$ showed the maximum ionic conductivity. Considering that all samples had the same morphology, it is postulated that the improved ionic conductivity in the normal tapered sample resulted from the lower $T_g$ of the conducting domains. As the POEM-based polymer electrolytes had similar molecular masses and chemical compositions, the shifting of the $T_g$ in the P(S-OEM) systems likely was caused by the presence of tapered interfaces. Additionally, it is hypothesized that the direction of $T_g$ shifting is influenced by the chain conformation at the block interface, which is different between the normal tapered and inverse tapered polymers.

Figure 4A:
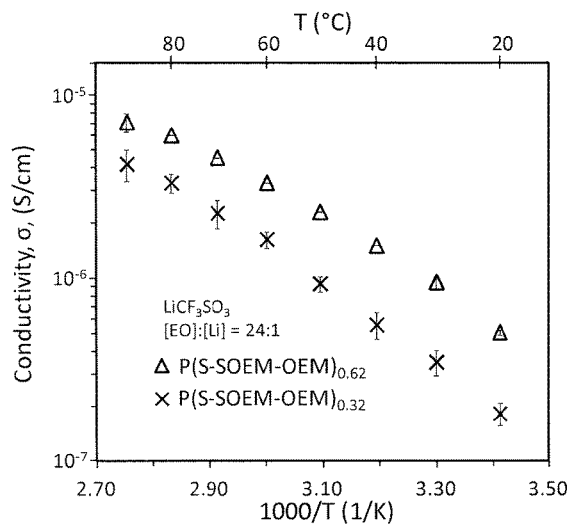
FIG. 4A illustrates the ionic conductivity profiles for salt-doped normal tapered P(S-SOEM-OEM) with taper volume fraction of 0.62 and 0.32 at salt-doping ratio of [EO]:[Li]=24:1.
Figure 4B:
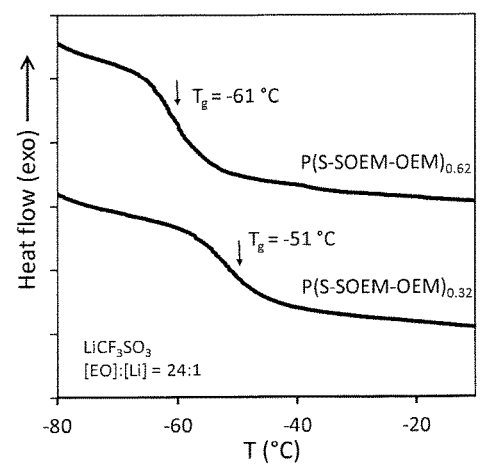
FIG. 4B illustrates the DSC traces of salt-doped polymers in FIG. 4A. The $T_g$s are indicated by arrows.

The effect of taper volume fraction on tapered block copolymer ionic conductivity was investigated using normal tapered block copolymers with ($f_{taper}$=0.62 (P(S-SOEM-OEM)$_{0.62}$) and $f_{taper}$=0.32 (P(S-SOEM-OEM)$_{0.32}$). The SAXS profile for LiCF$_3$SO$_3$-doped P(S-SOEM-OEM)$_{0.32}$ exhibited a LAM phase at a salt-doping ratio of [EO]:[Li]=15:1. To eliminate the morphology effect on the ionic conductivity (P(S-SOEM-OEM)$_{0.62}$ exhibited a HEX morphology at 15:1), a salt-doping ratio of 24:1 was chosen (both polymers exhibited LAM morphologies) to compare these tapered block copolymers. FIG. 4(a) shows the temperature-dependent ionic conductivity profiles for P(S-SOEM-OEM)$_{0.62}$ and P(S-SOEM-OEM)$_{0.32}$ at a salt-doping ratio of 24:1. P(S-SOEM-OEM)$_{0.32}$ exhibited lower conductivities relative to P(S-SOEM-OEM)$_{0.62}$ over the entire experimental temperature range, which was expected when considering that the $T_g$ of P(S-SOEM-OEM)$_{0.32}$ was 10° C. higher than that of P(S-SOEM-OEM)$_{0.62}$ (FIG. 4(b)). This result suggested that the ion transport in these materials is dominated by the $T_g$ and demonstrated that $T_g$ could be tuned by the interfacial width, thus allowing control of the ionic conductivity.

What is claimed is:

1. A copolymer comprising at least one block sequence represented by formula (I):

$$A—(T)—B \qquad (I)$$

wherein A is a vinyl aromatic block, T is a tapered copolymer region copolymerized from a vinyl aromatic monomer and an oligo(oxyalkylene) acrylate monomer and B is an oligo(oxyalkylene) acrylate block.

2. The copolymer of claim 1, wherein the tapered copolymer region has a first end coupled to the vinyl aromatic block and a second end coupled to the oligo(oxyalkylene) acrylate block and the content of vinyl aromatic monomer in the tapered copolymer region varies gradually from the first end to the second end.

3. The copolymer of claim 1, wherein the vinyl aromatic monomer has a structure corresponding to formula (V):

wherein $R^{10}$, $R^{11}$ and $R^{12}$ each represent, independently, a hydrogen atom or a C1 to C10 hydrocarbon group (optionally containing one or more heteroatoms), and $R^{13}$ represents an aryl or a heteroaryl group.

4. The copolymer of claim 1, wherein the tapering profile in the tapered copolymer region shows an increasing content of vinyl aromatic monomer in the direction from A to B.

5. The copolymer of claim 1, wherein the tapering profile in the tapered copolymer region shows a decreasing content of vinyl aromatic monomer in the direction from A to B.

6. The copolymer of claim 1, wherein the tapering profile in the tapered copolymer region shows a sinusoidal and/or sawtooth variation.

7. The copolymer of claim 1, wherein the vinyl aromatic block is a homopolymer of a vinyl aromatic monomer.

8. The copolymer of claim 1, wherein the vinyl aromatic block has been obtained by polymerization of a vinyl aromatic monomer which is the same as the vinyl aromatic monomer of the tapered copolymer region.

9. The copolymer of claim 1, wherein the oligo(oxyalkylene) acrylate block is a homopolymer of an oligo(oxyalkylene) acrylate monomer, which may be the same as or different from the oligo(oxyalkylene) acrylate monomer of the tapered copolymer region.

10. The copolymer of claim 1, wherein the oligo(oxyalkylene) acrylate is represented by formula (IIa):

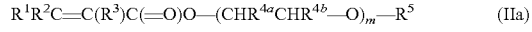

wherein $R^1$, $R^2$ and $R^3$ each represent, independently, a hydrogen atom or a hydrocarbon group of C1 to C10, $R^1$ and $R^3$ may be bonded together to form a ring, $R^{4a}$ and $R^{4b}$ each represent, independently, a hydrogen atom or a methyl group, $R^5$ represents a hydrogen atom, a hydrocarbon group, an acyl group, or a silyl group, m represents an integer from 2 to 100, and individual $R^{4a}$ and $R^{4b}$ groups are either identical or different.

11. The copolymer of claim 1, wherein the oligo(oxyalkylene) acrylate monomer is represented by formula (IIb)

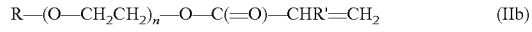

wherein n is an integer of 2 to 20, R is H or a C1-C6 alkyl group, and R' is H or CH$_3$.

12. The copolymer of claim 1, wherein the copolymer has a taper volume fraction of from 0.25 to 0.75.

13. The copolymer of claim 1, wherein the copolymer has an overall vinyl aromatic monomer volume fraction content of from 0.25 to 0.75.

14. A polymer electrolyte comprising at least one copolymer in accordance with claim 1 and at least one salt.

15. The polymer electrolyte of claim 14, wherein the at least one salt includes at least one lithium salt.

16. An electrochemical device comprising an electrode in electrical contact with a polymer electrolyte in accordance with claim 14.

17. A method of making a copolymer in accordance with claim 1, comprising the steps of:
a) polymerizing a first vinyl aromatic monomer to provide a first macroinitiator comprising vinyl aromatic block A;
b) reacting a second vinyl aromatic monomer, which may be the same as or different from the first vinyl aromatic monomer, and a first oligo(oxyalkylene) acrylate monomer with the first macroinitiator to provide a second macroinitiator comprised of tapered copolymer region T coupled to vinyl aromatic block A, wherein the first macroinitiator is present in a reaction mixture to which the second vinyl aromatic monomer and first oligo(oxyalkylene) acrylate monomer are added over a period of time and wherein the ratio of the rate of addition of second vinyl aromatic monomer to the rate of addition of the first oligo(oxyalkylene) acrylate monomer is varied over the period of time, wherein the second macroinitiator comprises a block sequence represented by structure A-(T); and c) reacting a second oligo(oxyalkylene) acrylate monomer, which may be the same as or different from the first oligo(oxyalkylene) acrylate monomer, with the second macroinitiator to form an oligo(oxyalkylene) acrylate block B coupled to tapered copolymer region T and thereby obtain the copolymer in accordance with claim 1.

18. The method of claim 17, wherein steps a)-c) are carried out using one or more polymerization techniques selected from anionic polymerization and atom transfer radical polymerization (ATRP).

19. The method of claim 17, wherein at least one of the first macroinitiator or second macroinitiator is isolated and purified before proceeding with subsequent step b) or c).

20. The method of claim 17, wherein the second vinyl aromatic monomer and the first oligo(oxyalkylene) acrylate monomer are added to the reaction mixture using metered pumping.

21. A method for preparing a copolymer comprising the following steps:

a) polymerizing a first monomer to provide a first macroinitiator comprising a block of the first monomer;

b) reacting the first monomer and a second monomer, which is different from the first monomer, with the first macroinitiator under conditions effective to polymerize the first monomer and second monomer and to provide a second macroinitiator comprised of a tapered region coupled to the block of the first monomer, wherein the first macroinitiator is present in a reaction mixture to which the first monomer and second monomer are added over a period of time and wherein the ratio of the rate of addition of the first monomer to the rate of addition of the second monomer is varied over the period of time; and c) reacting the second monomer with the second macroinitiator under conditions effective to polymerize the second monomer to form a block of the second monomer coupled to the tapered copolymer region;

wherein the first monomer is a vinyl aromatic monomer or an oligo(oxyalkylene) acrylate monomer and the second monomer is a vinyl aromatic monomer if the first monomer is an oligo(oxyalkylene) acrylate monomer and an oligo(oxyalkylene) acrylate monomer if the first monomer is a vinyl aromatic monomer.

* * * * *